2,784,145
RECOVERY OF STREPTOKINASE

Frank B. Ablondi, Pearl River, and Richard D. Mills, New City, N. Y., assignors to American Cyanamid Company, New York, N. Y., a corporation of Maine No Drawing. Application November 22, 1955, Serial No. 548,535

3 Claims. (Cl. 195—66)

This invention relates to an improved process for the recovery of streptokinase from fermentation beers.

The lytic principles, streptokinase and streptodornase, are elaborated by many strains of hemolytic streptococci, chiefly those of Group A and Lancefield Group C streptococci. Mixtures of streptokinase and streptodornase have been found to be useful in the lysis of purulent exudates and in the lysis of blood clots. Most of the fermentation procedures of necessity result in the production of varying amounts of both enzymes and various procedures have been devised to recover the enzymes from the fermentation beer, such as, for example, adsorption on a filter aid and elution therefrom, or by precipitation from the beer by the use of a suitable acid so as to form an enzyme-acid complex.

So far as we are aware, however, there has been no really successful and practical method of preferentially separating the enzymes from each other directly from the fermentation mash. For many purposes it would be desirable to have substantially pure streptokinase with little or no streptodornase. For example, since it is known that streptokinase activates plasminogen to form plasmin, the humoral enzyme, which, in turn, lyses fibrin, clotted blood and fibrinous exudates can be liquefied by the addition of streptokinase and situations frequently occur in clinical applications where the liquefaction of purulent exudates by the action of streptodornase is neither needed nor desired. In addition, pure streptokinase would be useful for the activation of human plasmin systems by intravenous injection, where other proteins might be detrimental and fewer side effects would be observed with pure streptokinase. Also, pure streptokinase would be useful in cases of phlebitis or occlusion of blood vessels by thrombi.

The present invention is based upon the discovery that excellent recoveries of substantially pure streptokinase can be secured from fermentation mash mixtures, with or without the cellular matter being present, if the fermentation beer is adjusted to a pH of between 6–7.5, followed by the addition of a suitable quantity of washed Florisil (more particularly described hereinafter) which preferentially adsorbs the streptokinase in the beer at this pH, decanting the cellular matter and mother liquor, and suspending the adsorbent and with the streptokinase adsorbed thereon, in alkaline water at a pH of from 9.5–11, whereby the streptokinase is eluted therefrom. The slurry is then filtered to remove the adsorbent and the activity passes into the filtrate.

It has been found by this procedure that very little, if any, streptodornase is picked up by the adsorbent at this pH and consequently an excellent separation of the two enzymes can be made. That is to say, that the streptodornase which remains in the beer (after the adsorption of the streptokinase therefrom) can be recovered by conventional means as, for example, by the procedure described in U. S. Patent No. 2,691,620.

The present invention is preferably carried out by adding an especially washed Florisil, or other suitable activated magnesium silicate, to the fermentation mash in an amount varying from about 0.5 to 2 parts by weight for each part of mash, after the mash has been adjusted to a pH of from 6–7.5. The mixture is stirred for a period of time and then allowed to stand. The adsorbent with the streptokinase adsorbed thereon then settles out. The cells and mother liquor are thereafter decanted or siphoned off and the residual solids are suspended in water. After settling and removing the mother liquor and remaining cells, the washed cake is suspended in cold water while dilute aqueous alkali is added to bring the pH to between 9.5–11. The mixture is stirred and filtered, whereupon the streptokinase passes into the filtrate.

Instead of the adsorption-elution procedure described above, this invention may also be carried out in a washed Florisil column to produce the same results.

As stated above, the magnesium silicate adsorbent must be properly washed in order to preferentially adsorb the streptokinase. This may be accomplished by suspending the Florisil at the ratio of 30 grams of Florisil to 100 cc. of water containing from 1 to 10 cc. of concentrated $H_2SO_4$. Lower amounts of acid may result in an inadequately adsorbing Florisil. This mixture is thereafter filtered and washed with distilled water until the wash filtrate is free of acid. The water-washed Florisil is then washed with acetone and air dried. The adsorbent used herein is an activated magnesium silicate in the form of hard porous granules and which is marketed by the Floridin Company of Warren, Pa., as "Florisil." Commercial Florisil of 60–100 mesh has been used satisfactorily in this invention.

Streptokinase assays in the present invention were carried out according to the method of Christensen, J. Clin. Invest. 28, 163 (1949); streptodornase assays were performed according to Christensen (ibid) as modified by Hozelhurst, J. Immun. 65, No. 1, 85 (1950). A unit of streptokinase may be defined as the amount of streptokinase which will activate enough plasminogen to give enough plasmin which will cause liquefaction of a standard clot formed from bovine fibrinogen and thrombin in 10 minutes at 37° C. A unit of streptodornase may be defined as the amount of streptodornase that will cause a change of 1.0 in the relative viscosity during a period of 10 minutes at 30° C. of a standard substrate of desoxyribonucleoprotein whose 0.15% solution has a relative viscosity of 4.0 to 5.5.

As will be obvious to those skilled in the art, the initial pH adjustment of the fermentation beer may be made with any of the common acids, such as hydrochloric, sulfuric, phosphoric, acetic, etc., and the alkali used in the dilute alkaline elution step may be any of the common alkalis, for example, sodium hydroxide, potassium hydroxide, sodium carbonate, etc.

The invention will be described in greater detail in conjunction with the following specific examples.

Example 1

300 liters of fermentation mash was adjusted to pH 6 with hydrochloric acid, and 3 kilograms of washed Florisil was added. The mixture was stirred for 1½ hours and then allowed to stand for 10 minutes. The cells and mother liquor were decanted, and the residual solids were resuspended in 20 liters of water. The suspension was allowed to settle, and the liquor was decanted. The Florisil cake was suspended in 30 liters of cold (0–4° C.) water, and while the mixture was stirred, dilute aqueous alkali was added until the pH held at 10.8. After filtration, an assay was run on an aliquot from the filtrate. Assay determinations were as follows:

|  | SK Units per ml. | Volume in liters | Total Units |
|---|---|---|---|
| Crude Mash | 390 | 300 | 117×10⁶ |
| Original Filtrate | <260 | 300 |  |
| Eluate | 3,100 | 30 | 93×10⁶ |

*Example 2*

The procedure of Example 1 was repeated except that 20 liters of cold distilled water was used in the elution step instead of 30 as in Example 1. The following assay determinations were obtained:

|  | SK Units per ml. | Volume in liters | Total Units |
|---|---|---|---|
| Crude Mash | 450 | 300 | 135×10⁶ |
| Adsorption Filtrate | <260 | 300 |  |
| Eluate | 3,100 | 20 | 62×10⁶ |

*Example 3*

The procedure of Example 1 was repeated on a crude fermentation mash. The following assay determinations were obtained:

|  | SK Units per ml. | Volume in liters | Total Units |
|---|---|---|---|
| Crude Mash | 1,400 | 300 | 420×10⁶ |
| Adsorption Filtrate | 0 | 300 |  |
| Eluate | 8,580 | 33 | 280×10⁶ |

*Example 4*

The procedure of Example 1 was repeated on a crude fermentation mash. The following assay determinations were obtained:

|  | Units per ml. | | Volume in liters | Total Units | |
|---|---|---|---|---|---|
|  | SK | SD |  | SK | SD |
| Crude Mash | 1,200 | 1,050 | 350 | 420×10⁶ | 350×10⁶ |
| Adsorption Filtrate | 0 |  | 350 |  |  |
| Eluate | 13,000 | 1,000 | 25 | 325×10⁶ | 25×10⁶ |

We claim:

1. The method of recovering streptokinase from fermentation beers containing the same which comprises adjusting the pH of the beer to between about 6 and 7.5, adding a quantity of a washed activated magnesium silicate thereto so as to preferentially adsorb the streptokinase thereon, and recovering the streptokinase therefrom by an alkaline elution at a pH of between about 9.5–11.

2. The method as in claim 1 in which the initial pH adjustment is to a pH of about 6.

3. The method as in claim 1 in which the elution is carried out at a pH of about 10.8.

References Cited in the file of this patent
UNITED STATES PATENTS

| 2,677,642 | Ablondi et al. | May 4, 1954 |
| 2,677,643 | Ablondi et al. | May 4, 1954 |
| 2,691,620 | Ablondi et al. | Oct. 12, 1954 |